(12) United States Patent
Braford, Jr.

(10) Patent No.: US 6,854,580 B2
(45) Date of Patent: Feb. 15, 2005

(54) TORSIONAL DAMPER HAVING VARIABLE BYPASS CLUTCH WITH CENTRIFUGAL RELEASE MECHANISM

(75) Inventor: Thomas E. Braford, Jr., Brighton, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 0 days.

(21) Appl. No.: 10/360,076

(22) Filed: Feb. 6, 2003

(65) Prior Publication Data

US 2004/0154896 A1 Aug. 12, 2004

(51) Int. Cl.[7] .............................. F16D 3/66; F16D 3/14
(52) U.S. Cl. ....................... 192/201; 192/214.1; 464/68
(58) Field of Search .............................. 192/201, 214.1, 192/70.17; 464/1, 2, 68, 64

(56) References Cited

U.S. PATENT DOCUMENTS

| | | | |
|---|---|---|---|
| 3,059,740 A | 10/1962 | Roche | 192/3.2 |
| 3,296,887 A | * 1/1967 | Larsen | 192/201 |
| 3,612,237 A | 10/1971 | Honda | 192/85 |
| 3,834,503 A | 9/1974 | Maurer et al. | 192/113 |
| 4,205,739 A | 6/1980 | Shelby et al. | 192/113 |
| 4,240,532 A | 12/1980 | Blomquist | 192/3.28 |
| 4,270,647 A | 6/1981 | Leber | 192/113 |
| 4,289,048 A | 9/1981 | Mikel et al. | 74/733 |
| 4,295,348 A | 10/1981 | Helfer et al. | 64/27 |
| 4,372,434 A | 2/1983 | Aschauer | 192/85 |
| 4,412,606 A | * 11/1983 | Loizeau | 192/201 |
| 4,437,551 A | 3/1984 | Gimmler et al. | 192/3.28 |
| 4,638,684 A | * 1/1987 | Maucher | 192/201 |
| 4,638,897 A | 1/1987 | Nishimura | 192/3.3 |
| 4,646,886 A | 3/1987 | Nishimura | 192/3.28 |
| 4,667,798 A | 5/1987 | Sailer et al. | 192/70.12 |
| 4,827,784 A | 5/1989 | Muller et al. | 74/330 |

(List continued on next page.)

*Primary Examiner*—Richard M. Lorence
(74) *Attorney, Agent, or Firm*—Bliss McGlynn, P.C.; Greg Dziegielewski

(57) ABSTRACT

A torsional damper (10) rotatably supported for translating torque between a prime mover and the input of a transmission including a torque input member (12) that is operatively connected for rotation with the power take-off of a prime mover, an output member (14) operatively connected for rotation with the input to a transmission and a plurality of damping elements (16) interposed between the input member and the output member. The damping members (16) act to translate torque between the input and output members and to dampen torsional forces generated between the prime mover and the transmission. A bypass clutch (40) acts to translate torque directly between the input and output members thereby providing a path for partial torque translation that bypasses the damping elements at low rotational speeds of the input and output members. In addition, the torsional damper (10) includes a clutch release mechanism (42) that is responsive to centrifugal forces acting on the torsional damper to disengage the bypass clutch (40) to reduce the torque translated directly between the input and output members at high rotational speeds.

4 Claims, 2 Drawing Sheets

U.S. PATENT DOCUMENTS

| | | | |
|---|---|---|---|
| 4,895,232 A | 1/1990 | Kobayashi | 192/3.3 |
| 4,909,362 A | 3/1990 | Miura et al. | 192/3.28 |
| 5,070,974 A | 12/1991 | Kirkwood | 192/3.3 |
| 5,174,420 A | 12/1992 | DeWald et al. | 188/264 |
| 5,245,889 A * | 9/1993 | Kohno et al. | 192/201 |
| 5,305,863 A | 4/1994 | Gooch et al. | 192/70.12 |
| 5,462,145 A | 10/1995 | Gimmler | 192/3.29 |
| 5,466,195 A | 11/1995 | Nogle et al. | 475/55 |
| 5,469,943 A | 11/1995 | Hill et al. | 188/264 |
| 5,477,950 A | 12/1995 | Maloof | 192/3.29 |
| 5,495,927 A | 3/1996 | Samie et al. | 192/70.12 |
| 5,538,121 A | 7/1996 | Hering | 192/70.12 |
| 5,553,693 A | 9/1996 | Schoder et al. | 192/3.29 |
| 5,577,588 A | 11/1996 | Raszkowski | 192/113.35 |
| 5,603,660 A | 2/1997 | Kyle | 464/68 |
| 5,613,588 A | 3/1997 | Vu | 192/113.35 |
| 5,655,635 A | 8/1997 | Yuergens et al. | 192/3.29 |
| 5,660,258 A | 8/1997 | Bacon et al. | 192/3.29 |
| 5,667,047 A * | 9/1997 | Weiss et al. | 192/201 |
| 5,720,475 A * | 2/1998 | Duclos | 192/201 |
| 5,755,314 A | 5/1998 | Kanda et al. | 192/70.12 |
| 5,816,924 A * | 10/1998 | Kajitani et al. | 192/201 |
| 5,823,880 A * | 10/1998 | Kajitani et al. | 192/201 |
| 5,935,007 A | 8/1999 | Yang | 464/24 |
| 6,244,407 B1 | 6/2001 | Kremer et al. | 192/70.12 |
| 6,371,857 B1 | 4/2002 | Kono et al. | 464/68 |

* cited by examiner

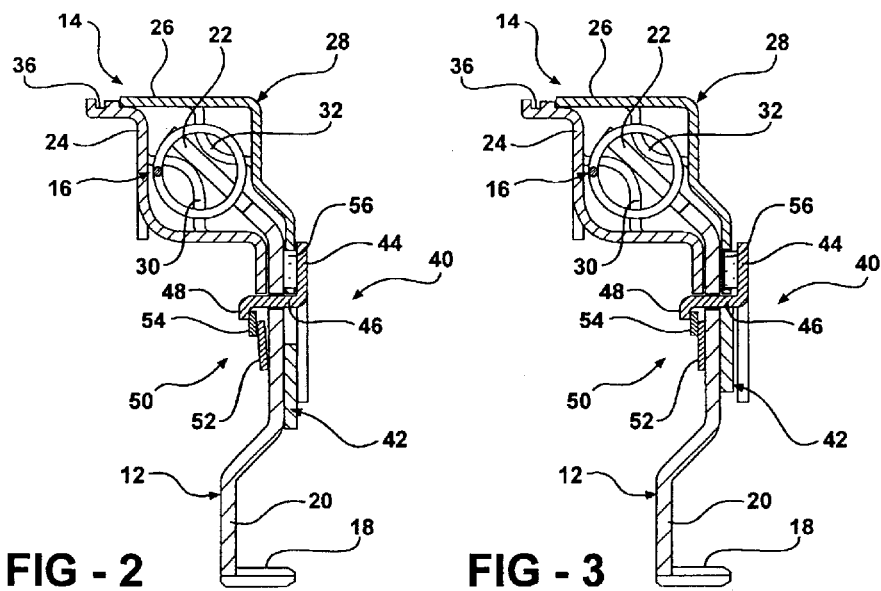
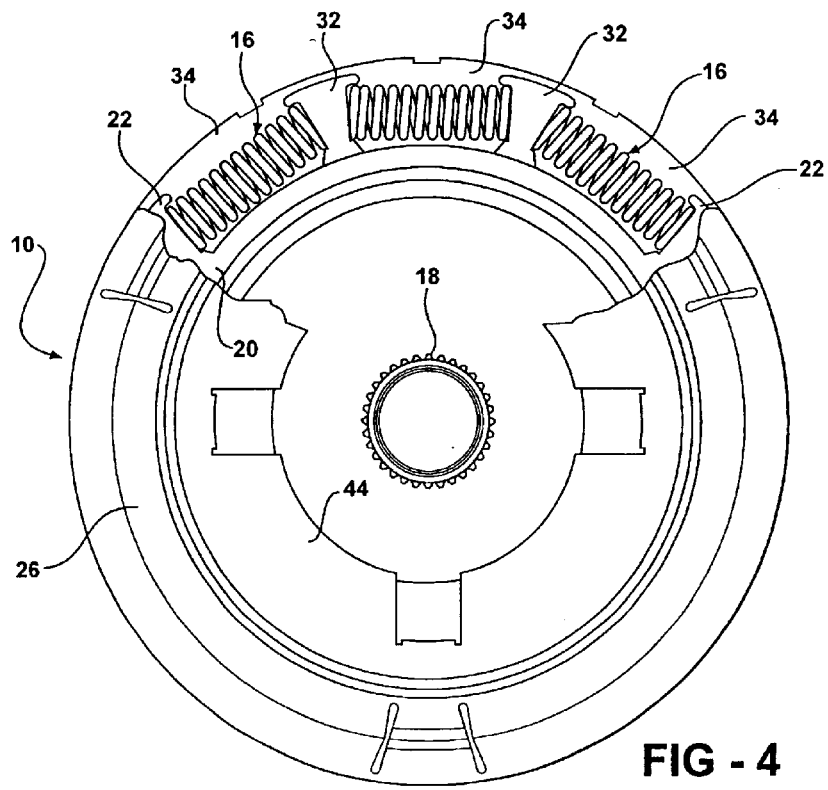

TORSIONAL DAMPER HAVING VARIABLE BYPASS CLUTCH WITH CENTRIFUGAL RELEASE MECHANISM

BACKGROUND OF THE INVENTION

1. Field of the Invention

The present invention relates, generally, to torsional dampers and, more specifically, to a torsional damper having a variable bypass clutch with a centrifugal release mechanism.

2. Description of the Related Art

In automotive applications, engine torque and speed are translated between a prime mover, such as an internal combustion engine, to one or more wheels through the transmission in accordance with the tractive power demand of the vehicle. Torque converters or start-up clutches are often employed between the internal combustion engine and its associated transmission.

Torsional damping mechanisms are well known in the related art for reducing vibrations and torque pulses between the prime mover and the transmission. One torsional damping mechanism commonly known in the art includes a drive ring that forms an annular rearward facing channel and that may be mounted to a lock-up piston in the torque converter. A plurality of coiled springs are carried in the channel for the drive ring and are engaged by a driven ring mounted to the turbine shell in the torque converter. The drive ring often includes lugs that are engaged by the coiled springs. This arrangement acts to dampen torsional vibrations due to impact loads and pulsations generated between the prime mover and the transmission. Torsional dampers of this type may also be employed between the prime mover and a start-up clutch or a pair of flywheels associated with the prime mover and the transmission, respectively.

While conventional torsional dampers employed in the related art have generally worked for their intended purposes, they are known to suffer from certain disadvantages. For example, it is not uncommon that, during vehicle launch, the torsional damper is subjected to relatively high torque peaks. When this occurs, it is possible for the coiled springs to be over-compressed to the point that they "bottom out." When this occurs, the relative rotation between the drive and driven members is described as "over-travel" and results in the generation of noise and vibration through the vehicle driveline. Over-travel is a condition of "high hysteresis" between the drive and driven members. Over-travel may be combated by employing stiffer coiled springs. However, with the increase in the stiffness of the coiled spring, there is an associated decrease in damping through the torsional damper. On the other hand, following vehicle launch and at high rotational speeds, the input and output members of the torsional damper rotate, for the most part, substantially together so that there is little or no relative rotation therebetween. Thus, the torsional damper operates in a condition of "low hysteresis." In this operative mode, the coiled springs adequately function to absorb the minimal torque pulses and vibrations that may be generated between the prime mover and the transmission.

While there have been a number of solutions that have been proposed in the related art to address the problems associated with high hysteresis during launch and a low hysteresis during higher rotational speeds after launch, the conventionally known torsional dampers that embody these solutions typically employ a relatively high number of components and an associated increase in cost to address the operational challenges that are placed on the torsional dampers. Notwithstanding the problem of effectively damping impact loads, pulsations, torque peaks, and vibrations between the prime mover and the transmission, there is a continuous demand for weight reduction and efficiency improvements in the art of torsional damping mechanisms.

Thus, there remains a need in the art for a torsional damper that may, efficiently, and cost effectively address operational environments that generate high hysteresis at low rotational speeds and low hysteresis at high rotational speeds. In addition, there remains a need in the art for such a torsional damper that is relatively mechanically simple and that does not add prohibitive weight or cost to the torsional damper.

SUMMARY OF THE INVENTION

The deficiencies in the related art are overcome in a torsional damper that is rotatably supported for translating torque between a prime mover and the input of a transmission. The torsional damper includes a torque input member that is operatively connected for rotation with the power take-off of a prime mover. An output member is operatively connected for rotation with the input to a transmission and a plurality of damping elements is interposed between the input member and the output member. The damping members act to translate torque between the input and output members and to dampen torsional forces generated between the prime mover and the transmission. A bypass clutch acts to translate torque directly between the input and output members thereby providing a path for partial torque translation that bypasses the damping elements at low rotational speeds of the input and output members. In addition, the torsional damper includes a clutch release mechanism that is responsive to centrifugal forces acting on the torsional damper to disengage the bypass clutch to reduce the torque translated directly between the input and output members at high rotational speeds.

The bypass clutch functions to transmit a predetermined amount of torque between the torque input and output members of the torsional damper at low rotational speeds. In this way, the problem of over-travel and the resulting noise and vibration may be avoided by reducing the torsional load on the damper elements. Further, at conditions of low hysteresis and high rotational speeds, the clutch release mechanism acts in response to centrifugal forces acting on the rotating torsional damper to disengage the bypass clutch so that all or most of the torque is translated from the torque input member to the output member through the damping elements. In this way, the vibrations that may occur at high rotational speeds may be damped.

Thus, the torsional damper of the present invention adequately addresses the problems associated with high hysteresis during launch and low hysteresis at high rotational speeds after launch in a self-actuating manner. Further, the bypass clutch and clutch release mechanism facilitate the use of less stiff or more responsive damping elements that tend to be less expensive than the stiffer damping elements commonly employed in the related art. The torsional damper of the present invention is mechanically simple, does not add prohibitive weight or cost to the assembly, and thereby effectively addresses the problems posed by the operational environment in which the damper is employed.

BRIEF DESCRIPTION OF THE DRAWINGS

Other advantages of the invention will be readily appreciated as the same becomes better understood by reference to the following detailed description when considered in connection with the accompanying drawings, wherein:

FIG. 2 is a cross-sectional side view of one half of the annular torsional damper of the present invention illustrating the bypass clutch in the engaged mode;

FIG. 3 is a cross-sectional side view of one half of the annular torsional damper of the present invention illustrating the bypass clutch in the disengaged mode;

FIG. 4 is a partially broken-away end view of the torsional damper of the present invention illustrating the damping elements.

DETAILED DESCRIPTION OF THE PREFERRED EMBODIMENT(S)

Figure 5:
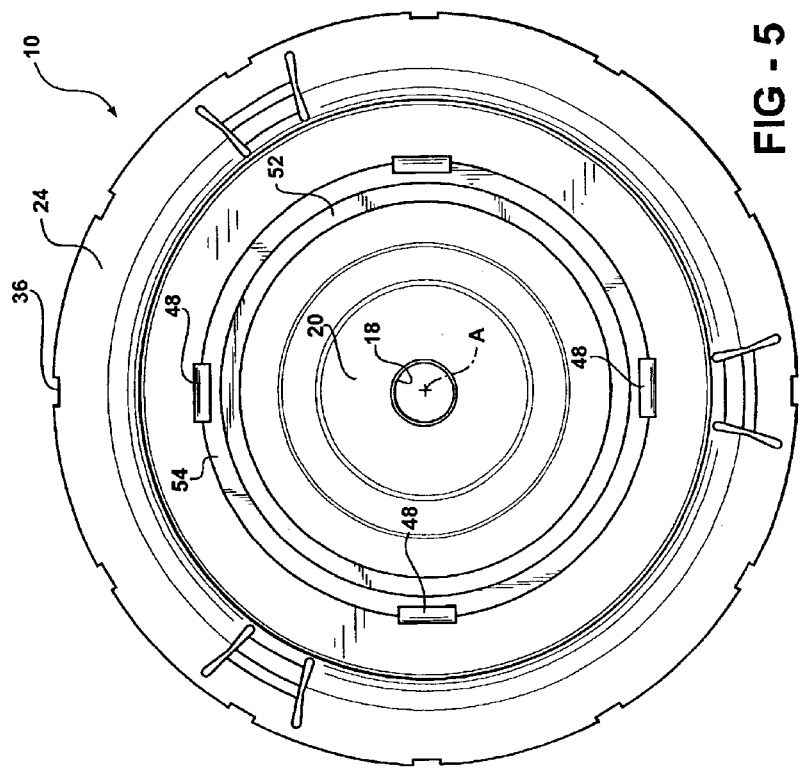
FIG. 5 is an opposite end view of the torsional damper of the present invention illustrated in FIG. 4.

Referring now to the figures, where like numerals are used to describe like structure, a torsional damper that is adapted to be rotatably supported for translating torque between a prime mover such as an internal combustion engine (not shown) to the input shaft of a transmission is generally indicated at 10. The transmission may then subsequently distribute this power to one or more wheels (not shown) through other drivetrain components such as a drive shaft and an axle having a differential (also not shown). While the torsional damper illustrated in these figures is particularly adapted for use with an automotive vehicle, those having skill in the art will understand that the torsional damper of the present invention may be employed in connection with other types of transmissions.

The torsional damper 10 includes a torque input member, generally indicated at 12, that is operatively connected for rotation with the power take-off of the prime mover, an output member, generally indicated at 14, that is operatively connected for rotation with the input to the transmission and a plurality of damping elements, generally indicated at 16, that are interposed between the input member 12 and the output member 14. The damping member 16 acts to translate torque between the input and the output members 12, 14, respectively, and to dampen torsional forces generated between the prime mover and the transmission.

The torque input member 12 includes a splined hub 18 that is adapted to mate in cooperative rotational relationship with a correspondingly splined shaft or hub that is operatively connected to the crankshaft, flywheel, or other power take-off device associated with an internal combustion engine. An annular drive plate 20 extends radially outward from the splined hub 18 and terminates in a plurality of drive lugs 22. The drive lugs 22 are disposed spaced relative to one another annularly about the circumference of the drive plate 20 for a purpose that will be described in greater detail below.

The output member 14 includes a pair of sheet metal retainers 24, 26 that cooperate to define a damper housing 28. Each retainer 24, 26 has a plurality of opposing tabs 30, 32 that are bent inwardly relative to the damper housing 28. Each corresponding pair of tabs 30, 32 are spaced annularly relative to an adjacent pair of tabs 30, 32 so as to define a plurality of windows 34 in the housing 28 as best shown in FIG. 4. A damping element 16 is cooperatively received and supported in each window 34 defined in the damper housing 28. Similarly, the terminal ends of each drive lug 22 of the drive plate 20 are received within the damper housing 28 such that the drive lug 22 is located between a pair of opposed tabs 30, 32. In the preferred embodiment illustrated herein, the damping elements 16 are coiled springs supported in each window 34 between a pair of opposed tabs 30, 32 or between a drive lug 22 and a pair of opposed tabs. Torque is translated from the drive plate 20 through the drive lugs 22 to the output member 14 via the coiled springs 16 and the tabs 30, 32 formed in the damper housing 28 as will be described in greater detail below. The sheet metal retainer 24 may define an annular output hub 36 that is operatively connected to a corresponding flywheel, torque converter, or start-up clutch (not shown) associated with the transmission as is commonly known in the art.

The torsional damper 10 of the present invention also includes a bypass clutch, generally indicated at 40, that acts to translate torque directly between the input and output members 12, 14, respectively, and thereby provides a path for partial torque translation that bypasses the damping elements 16 at low rotational speeds of the input and output members 12, 14. In addition, the torsional damper 10 includes a clutch release mechanism, generally indicated at 42. The clutch release mechanism 42 is responsive to centrifugal forces acting on the torsional damper 10 to disengage the bypass clutch 40 in a way that reduces the torque translated directly between the input and output members 12, 14 through the bypass clutch 40 at high rotational speeds. In the preferred embodiment illustrated in these figures, the bypass clutch 40 and the clutch release mechanism 42 are operatively supported by the input member 12. However, from the description that follows, those having ordinary skill in the art will appreciate that the bypass clutch 40 and clutch release mechanism 42 may be supported by the output member 14 or any other structure associated with the torsional damper 10.

More specifically, the bypass clutch 40 includes an annular friction plate 44 that is disposed generally spaced from the drive plate 20 but that is in frictional contact with the output member 14 as will be described in greater detail below. The annular friction plate 44 includes a plurality of fingers 46 annularly disposed in spaced relationship relative to one another about the rotational axis A of the torsional damper 10. The plurality of fingers 46 extend toward and are carried by the drive plate 20. In addition, each finger 46 includes a downwardly extending tab 48. More specifically, each tab 48 extends in the general direction of the rotational axis A of the torsional damper. However, those having ordinary skill in the art will appreciate from the description that follows that the downwardly extending tabs 48 may extend in any other direction. A biasing member, generally indicated at 50, acts on the plurality of fingers 48 to constantly bias the friction plate 44 into engagement with the drive plate 20.

More specifically, the biasing member 50 includes a Bellville spring 52 that is disposed between the drive plate 20 and the fingers 46. The Bellville spring 52 provides a constant biasing force on the frictional plate 44 in a direction that is generally parallel to the axis of rotation A of the torsional damper 10. The biasing member 50 also includes a snap ring 54 that is located between the Bellville spring 52 and the downwardly extending tabs 48 formed on the terminal end of each finger 46. Thus, the Bellville spring 52 provides a constant biasing force that acts between the drive plate 20 and the downwardly extending tabs 48 through the snap ring 54.

The output member 14 and, more specifically, one of the sheet metal retainers 26 that define the damper housing 28 includes a annular friction surface 56. The friction surface 56 is formed opposite to and corresponds with the friction plate 44 of the bypass clutch 40. The biasing force generated by the Bellville spring 52 forces the annular friction plate 44 into frictional contact with the friction surface 56 of the sheet metal retainer 26. Frictional engagement between the plate 44 and the output member 14 serves to translate torque directly between the input member 12 and the output member 14 and bypassing the damper member 16. However, the bypass clutch 40 does not act to translate the total torque that is communicated between the input member 12 and the output member 14. Rather, in one preferred embodiment, approximately 50 to 200 foot pounds of torque are translated through the bypass clutch when the friction plate 44 and the friction surface 56 are engaged. This reduces the load on the damping elements 16 and helps to prevent the problems associated with overtravel and high hysteresis at low rotational speeds. Thus, in the preferred embodiment contemplated by the inventor, the annular friction surface 56 and the friction plate 44 are adapted for continuously slipping engagement relative to one another so as to translate torque therebetween.

On the other hand, the bypass clutch 40 of the present invention may be moved to a disengaged position which eliminates or reduces the amount of torque translated through the clutch 40. Ideally, the bypass clutch 40 of the present invention is adapted to be moved to its disengaged position at high rotational speed where conditions of low hysteresis exist between the input 12 and the output member 14.

Figure 1:
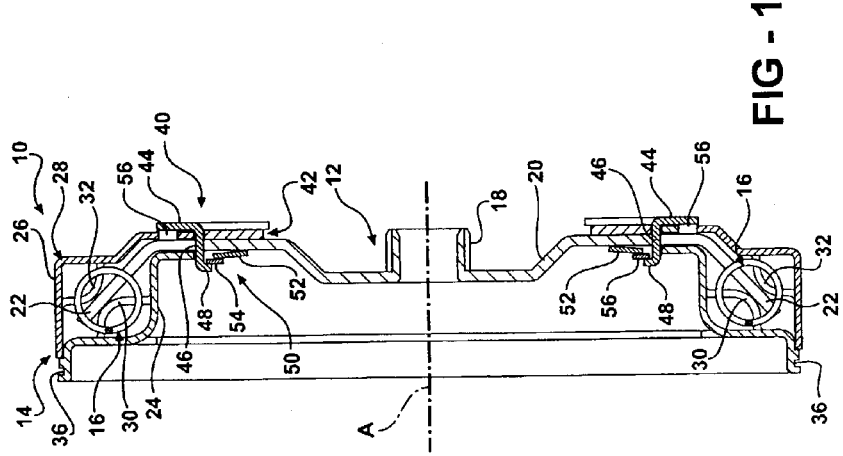
FIG. 1 is a cross-sectional side view of the torsional damper of the present assembly.

Referring specifically to FIGS. 1, 2, and 3, it will be appreciated that the fingers 46 are offset from the center of gravity of the friction plate 44. The clutch release mechanism 42 of the present invention is interposed for radial movement between the friction plate 44 and the drive plate 20 in response to an increase in centrifugal forces acting on the torsional damper 10 as the rotational speed thereof increases. More specifically, the clutch release mechanism 42 is radially moveable to move the friction plate 44 in a direction opposite to the biasing force generated by the Bellville springs 52. Thus, in one preferred embodiment, the clutch release mechanism 42 may include a plurality of ball bearings that are supported for radial movement in a direction away from the rotational axis A of the torsional damper. Movement in this direction by the ball bearings acts to bias the friction plate 44 into a disengaged position. In the disengaged position, the friction plate 44 is either moved out of frictional engagement with the friction surface 56 on the sheet metal retainer 26 or the normal force acting between these two surfaces is reduced so as to reduce the torque translation therebetween. Alternatively, the clutch release mechanism 42 of the present invention may also include any non-compressible fluid that is supported for radial movement between the friction plate 44 and the drive member 20 such that centrifugal forces acting on the torsional damper tend to move the clutch release mechanism 42 in a self-actuating manner away from the rotational axis A of the torsional damper to bias the friction plate 44 into the disengaged position as described above.

The bypass clutch functions to transmit a predetermined amount of torque between the torque input and output members of the torsional damper at low rotational speeds. More specifically, at low rotational speeds, the friction plate 44 is biased into engagement with the friction surface 56 thereby providing a path for direct torque translation between the torque input member 12 and the output member 14, bypassing the coiled springs 16 in a range of approximately 50–200 foot pounds of torque. In this way, the problem of over-travel and the resulting noise and vibration may be avoided by reducing the torsional load on the damper elements. Further, at conditions of low hysteresis and high rotational speeds, the clutch release mechanism acts in response to centrifugal forces acting on the rotating torsional damper to disengage the bypass clutch so that all or most of the torque is translated from the torque input member to the output member through the damping elements. In this way, the vibrations that may occur at high rotational speeds may be damped.

Thus, the torsional damper of the present invention adequately addresses the problems associated with high hysteresis during launch and low hysteresis at high rotational speeds after launch in a self-actuating manner. Further, the bypass clutch and clutch release mechanism facilitate the use of less stiff or more responsive damping elements that tend to be less expensive than the stiffer damping elements commonly employed in the related art. The torsional damper of the present invention is mechanically simple, does not add prohibitive weight or cost to the assembly, and thereby effectively addresses the problems posed by the operational environment in which the damper is employed.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

I claim:

1. A torsional damper (10) rotatably supported for translating torque between a prime mover and the input of a transmission, said torsional damper (10) comprising:

a torque input member (12) operatively connected for rotation with the power take off of a prime mover, an output member (14) operatively connected for rotation with the input to a transmission and a plurality of damping elements (16) interposed between said input member (12) and said output member (14), said damping members (16) acting to translate torque between said input and said output members and to dampen torsional forces generated between the prime mover and the transmission;

a bypass clutch (40) including an annular friction plate (44) disposed generally spaced from said torque input member (12) and in frictional contact with said output member (14), said annular friction plate (44) including a plurality of fingers (46) annularly disposed in spaced relationship relative to one another about the rotational axis (A) of the torsional damper, said plurality of fingers (46) extending toward and being carried by said input member (12), a biasing member (50) acting on said plurality of fingers (46) to constantly bias said friction plate (44) into engagement with said output member (14), said output member (14) including an annular friction surface (56) disposed opposite to and corresponding to said friction plate (44) of said bypass clutch (40), said annular friction surface (56) and said friction plate (44) adapted for continuously slipping engagement to translate torque directly between said input and output members thereby providing a path for partial torque translation bypassing said damping elements at low rotational speeds of said input and output members; and a clutch release mechanism (42) operatively supported by said input member (12) and responsive to centrifugal forces acting on said torsional damper to disengage said bypass clutch (40) to reduce the torque translated directly between said input and output members at high rotational speeds.

2. A torsional damper (10) as set forth in claim 1 wherein said biasing member (50) includes a Bellville spring (52) disposed between said input member (12) and said plurality of fingers (46) to provide a constant biasing force on said frictional plate (44) in the direction of the axis of rotation of the torsional damper.

3. A torsional damper (10) as set forth in claim 2 wherein each of said plurality of fingers (46) includes a downwardly extending tab (48), said biasing member (50) including a snap ring (54) disposed between said Bellville spring (52) and said downwardly extending finger (48).

4. A torsional damper (10) as set forth in claim 1 wherein said fingers (46) are located offset from the center of gravity of said friction plate (44), said release member (42) being radially moveable to move said friction plate (44) in a direction opposite said biasing force generated by said Bellville spring (52).

* * * * *